(12) United States Patent
Taira et al.

(10) Patent No.: US 11,919,168 B2
(45) Date of Patent: Mar. 5, 2024

(54) ROBOT CONTROL SYSTEM, ROBOT CONTROL METHOD, AND COMPUTER READABLE MEDIUM

(71) Applicant: TOYOTA JIDOSHA KABUSHIKI KAISHA, Toyota (JP)

(72) Inventors: Tetsuya Taira, Nagakute (JP); Shiro Oda, Anjo (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 17/523,016

(22) Filed: Nov. 10, 2021

(65) Prior Publication Data

US 2022/0241965 A1 Aug. 4, 2022

(30) Foreign Application Priority Data

Feb. 1, 2021 (JP) .................................. 2021-014557

(51) Int. Cl.
*B25J 9/16* (2006.01)
*G05D 1/00* (2006.01)

(52) U.S. Cl.
CPC ........... *B25J 9/1653* (2013.01); *B25J 9/1682* (2013.01); *G05D 1/0291* (2013.01); *G05D 2201/0216* (2013.01)

(58) Field of Classification Search
CPC ....... B25J 9/1679; B25J 9/1661; B25J 11/008
See application file for complete search history.

(56) References Cited

U.S. PATENT DOCUMENTS

| 8,027,750 B2* | 9/2011 | Orita | ................... | H02J 7/00036 320/138 |
| 11,529,975 B2* | 12/2022 | Li | ........................... | G08G 1/202 |
| 2012/0029685 A1* | 2/2012 | Keller | .................. | B65G 1/1373 700/216 |
| 2013/0000438 A1* | 1/2013 | Ouellet | ................ | B25J 15/0009 74/490.03 |
| 2013/0238117 A1* | 9/2013 | Yagawa | ........... | G05B 19/41895 700/228 |

(Continued)

FOREIGN PATENT DOCUMENTS

JP 2020154592 A 9/2020
WO 2015059739 A1 4/2015

*Primary Examiner* — Dalena Tran
(74) *Attorney, Agent, or Firm* — Dickinson Wright, PLLC

(57) ABSTRACT

A robot control system according to the present embodiment is a robot control system that controls a plurality of transport robots that is travelable autonomously in a facility. The robot control system: acquires error information indicating that an error has occurred in a first transport robot; acquires transported object information related to a transported object of the first transport robot; determines a second transport robot able to transport the transported object of the first transport robot among the transport robots based on the transported object information and the error information; and moves the second transport robot to a transfer location of the transported object of the first transport robot.

21 Claims, 6 Drawing Sheets

(56) References Cited

U.S. PATENT DOCUMENTS

2014/0046512 A1\* 2/2014 Villamar .............. G05D 1/0212
701/19
2016/0026186 A1 1/2016 Kazama et al.

\* cited by examiner

FIG. 2
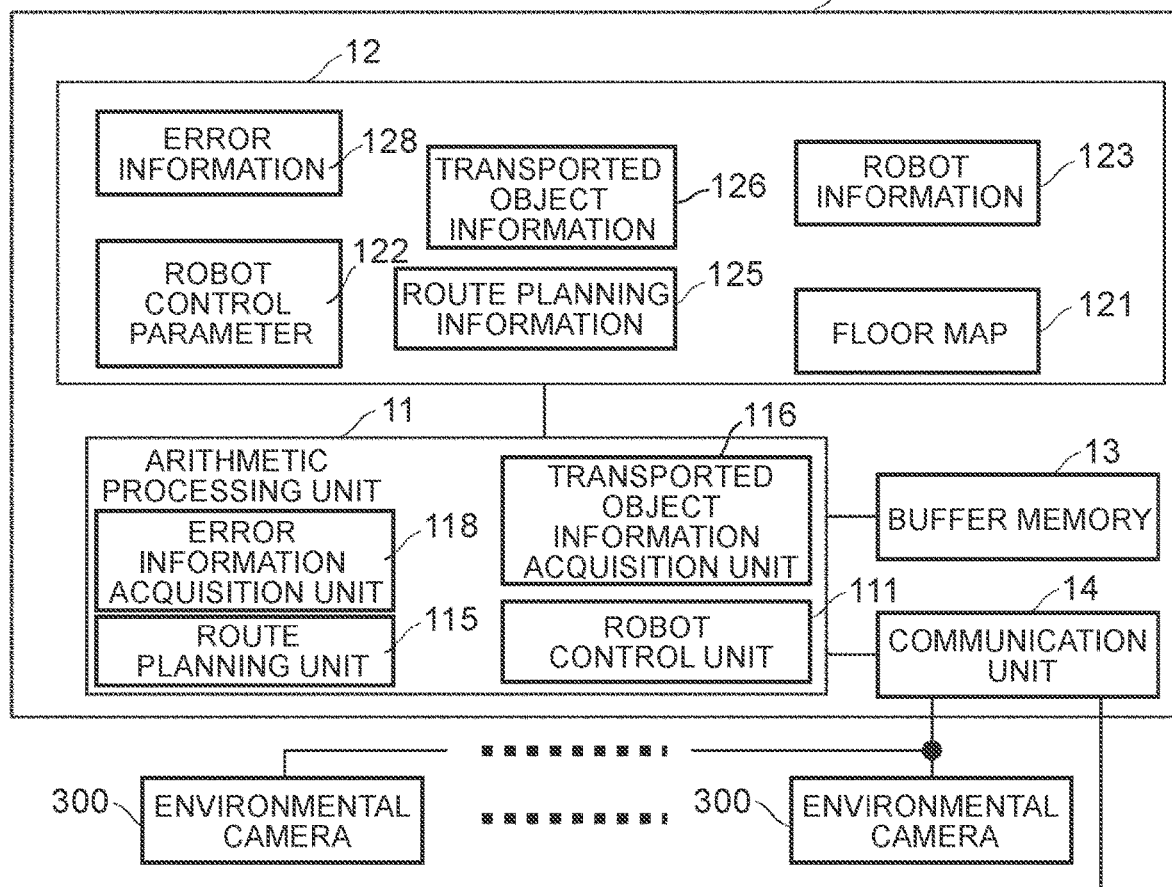
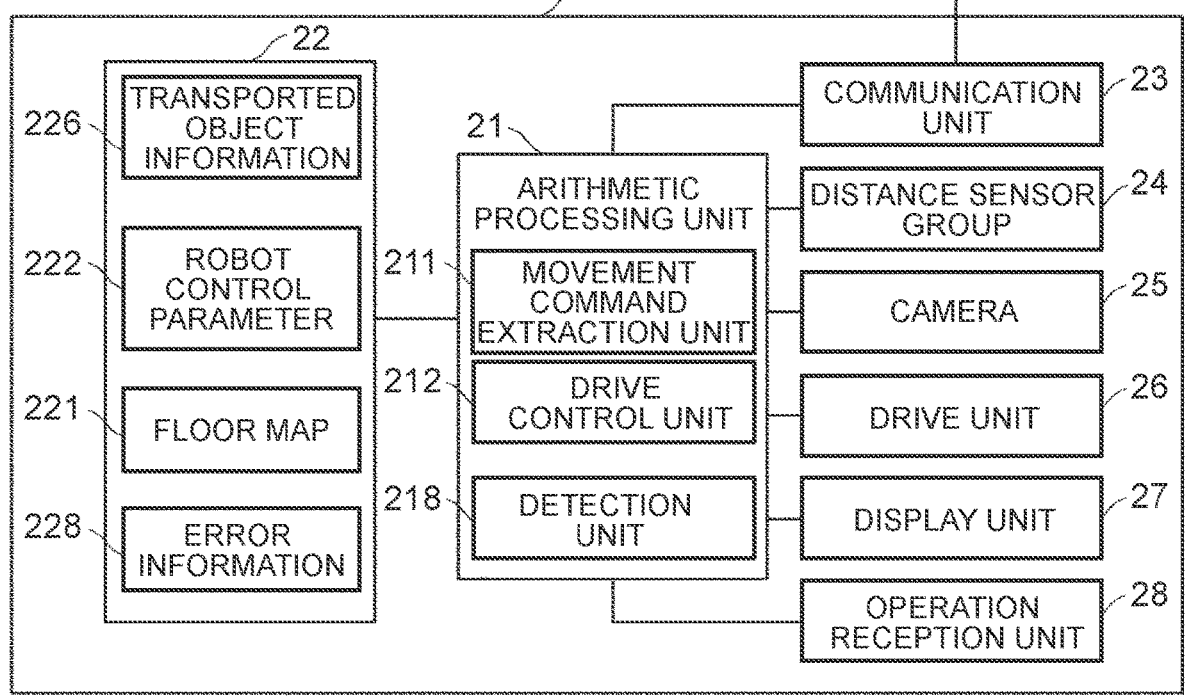

ROBOT CONTROL SYSTEM, ROBOT CONTROL METHOD, AND COMPUTER READABLE MEDIUM

CROSS-REFERENCE TO RELATED APPLICATION

This application claims priority to Japanese Patent Application No. 2021-014557 filed on Feb. 1, 2021, incorporated herein by reference in its entirety.

BACKGROUND

1. Technical Field

The present disclosure relates to a robot control system, a robot control method, and a computer-readable medium.

2. Description of Related Art

WO 2015/59739 discloses a transport system including a plurality of transport vehicles. In the system disclosed in WO 2015/59739, transported objects are handed over from a handing-over vehicle to a handed-over vehicle among the transport vehicles. The transport system above determines a handover area to which the transported object is transported by the handing-over vehicle. The transport system determines the transport vehicle serving as the handed-over vehicle based on the handover area and the position information of the transport vehicle. The transport system commands the handing-over vehicle to carry out the task of transporting the transported object to the handover area, and commands the handed-over vehicle to carry out the task of transporting the transported object from the handover area.

SUMMARY

In the transport system described above, it is desired to more efficiently transport the transported objects. For example, when the transport vehicle breaks down, the transport vehicle cannot move to the handover area. Therefore, there is an issue that the transported object cannot be transported.

The present disclosure has been made to solve such an issue, and provides a robot control system, a robot control method, and a computer-readable medium capable of appropriately controlling the robot.

A robot control system according to the present embodiment is a robot control system that controls a plurality of transport robots that is travelable autonomously in a facility. The robot control system: acquires error information indicating that an error has occurred in a first transport robot; acquires transported object information related to a transported object of the first transport robot; determines a second transport robot able to transport the transported object of the first transport robot among the transport robots based on the transported object information and the error information; and moves the second transport robot to a transfer location of the transported object of the first transport robot.

In the above-mentioned robot control system, the robot control system may determine a priority of a transfer of the transported object based on the transported object information.

In the above-mentioned robot control system, the robot control system may output a transfer request message for requesting a transfer of the transported object to a staff member of the facility.

In the above-mentioned robot control system, the robot control system may set the staff member to whom the transfer request message is output in accordance with the transported object information.

In the above-mentioned robot control system, the robot control system may determine a necessity of the transfer based on the transported object information.

In the above-mentioned robot control system, the robot control system may determine a necessity of the transfer based on the error information.

In the above-mentioned robot control system, when the robot control system determines that the transfer is not necessary in accordance with the transported object information, the robot control system may output a transport request message for making a transport request to a staff member of the facility.

A robot control method according to the present embodiment is a robot control method that controls a plurality of transport robots that is travelable autonomously in a facility, and the robot control method includes: acquiring error information indicating that an error has occurred in a first transport robot; acquiring transported object information related to a transported object of the first transport robot; determining a second transport robot able to transport the transported object of the first transport robot among the transport robots based on the transported object information and the error information; and moving the second transport robot to a transfer location of the transported object of the first transport robot.

The above-mentioned robot control method may further include determining a priority of a transfer of the transported object based on the transported object information.

The above-mentioned robot control method may further include outputting a transfer request message for requesting a transfer of the transported object to a staff member of the facility.

The above-mentioned robot control method may further include setting the staff member to whom the transfer request message is output in accordance with the transported object information.

The above-mentioned robot control method may further include determining a necessity of the transfer based on the transported object information.

The above-mentioned robot control method may further include determining a necessity of the transfer based on the error information.

The above-mentioned robot control method may further include outputting a transport request message for making a transport request to a staff member of the facility when the transfer is determined to be not necessary in accordance with the transported object information.

A computer-readable medium according to the present embodiment stores a program that causes a computer to execute a robot control method that controls a plurality of transport robots that is travelable in a facility, and includes: acquiring error information indicating that an error has occurred in a first transport robot; acquiring transported object information related to a transported object of the first transport robot; determining a second transport robot able to transport the transported object of the first transport robot among the transport robots based on the transported object information and the error information; and moving the second transport robot to a transfer location of the transported object of the first transport robot.

In the above computer-readable medium, a priority of a transfer of the transported object may be determined based on the transported object information.

In the above computer-readable medium, a transfer request message for requesting a transfer of the transported object may be output to a staff member of the facility.

In the above computer-readable medium, the staff member to whom the transfer request message is output may be set in accordance with the transported object information.

In the above computer-readable medium, a necessity of the transfer may be determined based on the transported object information.

In the above computer-readable medium, a necessity of the transfer may be determined based on the error information.

In the above computer-readable medium, when the transfer is determined to be not necessary in accordance with the transported object information, a transport request message for making a transport request may be output to a staff member of the facility.

The present disclosure can provide a robot control system, a robot control method, and a computer-readable medium capable of appropriately controlling the transport robot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a control block diagram of a control system according to the present embodiment;

DETAILED DESCRIPTION OF EMBODIMENTS

Hereinafter, the present disclosure will be described through embodiments of the disclosure, but the disclosure according to the scope of the claims is not limited to the following embodiments. Moreover, not all of the configurations described in the embodiments are indispensable as means for solving the problem.

Schematic Configuration

Figure 1:
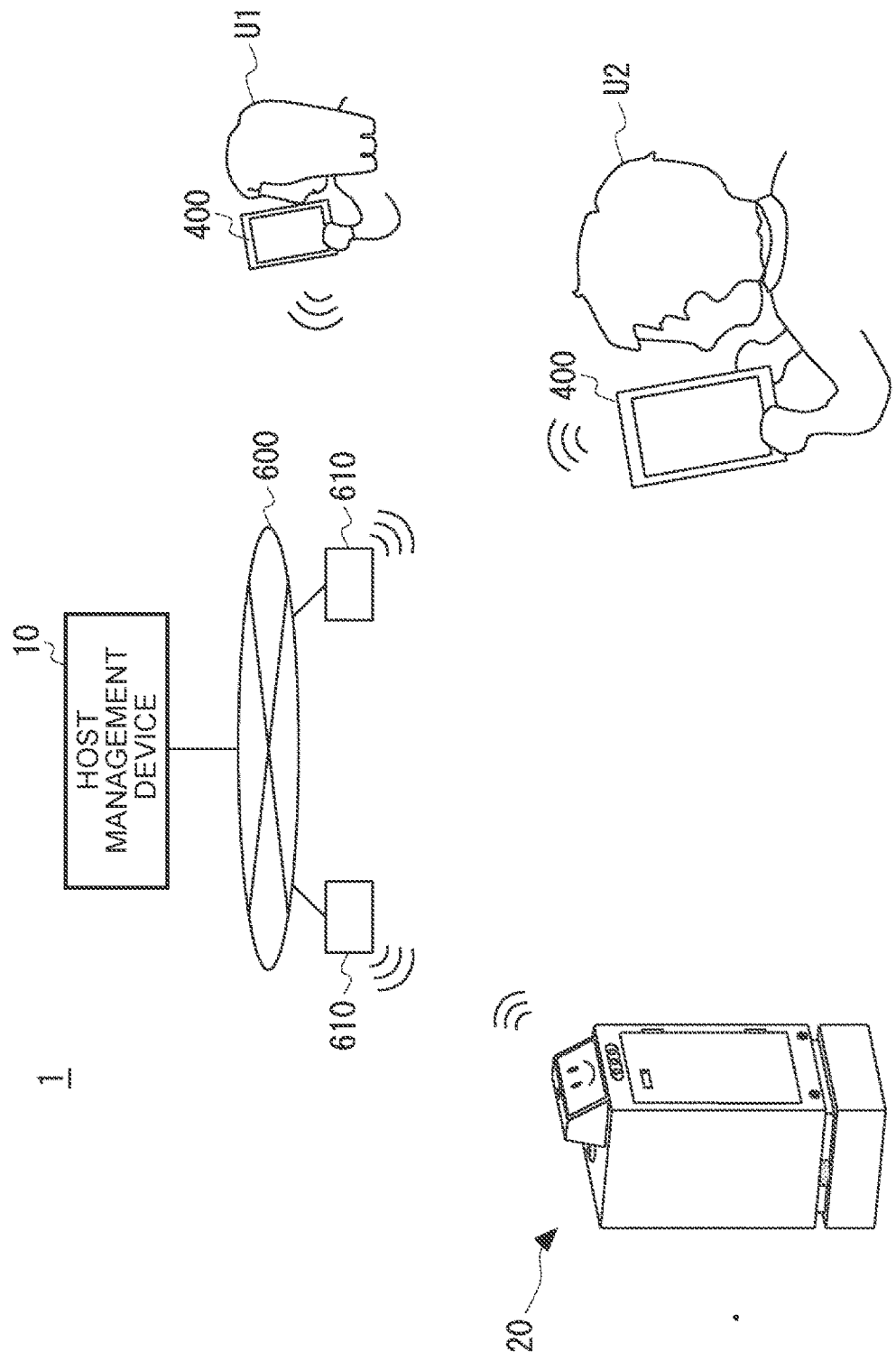
FIG. 1 is a conceptual diagram illustrating an overall configuration of a system in which a mobile robot according to the present embodiment is used.

FIG. 1 is a conceptual diagram illustrating an overall configuration of a system 1 in which a mobile robot 20 according to the present embodiment is used. For example, the mobile robot 20 is a transport robot that executes transport of a transported object as a task. The mobile robot 20 autonomously travels in order to transport a transported object in a medical welfare facility such as a hospital, a rehabilitation center, a nursing facility, and an elderly care facility. The system 1 according to the present embodiment can also be used in a commercial facility such as a shopping mall.

A user U1 stores the transported object in the mobile robot 20 and requests the transport. The mobile robot 20 autonomously moves to the set destination to transport the transported object. That is, the mobile robot 20 executes a luggage transport task (hereinafter also simply referred to as a task). In the following description, the location where the transported object is loaded is referred to as a transport source, and the location where the transported object is delivered is referred to as a transport destination.

For example, it is assumed that the mobile robot 20 moves in a general hospital having a plurality of clinical departments. The mobile robot 20 transports equipment, consumables, medical equipment, and the like between the clinical departments. For example, the mobile robot 20 delivers the transported object from a nurse station of one clinical department to a nurse station of another clinical department. Alternatively, the mobile robot 20 delivers the transported object from the storage of the equipment and the medical equipment to the nurse station of the clinical department. The mobile robot 20 also delivers medicine dispensed in the dispensing department to the clinical department or a patient that is scheduled to use the medicine.

Examples of the transported object include medicines, consumables such as packaging bags, specimens, testing instruments, medical equipment, hospital food, and equipment such as stationery. The medical equipment includes sphygmomanometers, blood transfusion pumps, syringe pumps, foot pumps, nurse call buttons, bed leaving sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, echo machines, and the like. Meals such as hospital food and inspection meals may also be transported. Further, the mobile robot 20 may transport used equipment, tableware that have been used during meals, and the like. When the transport destination is on a different floor, the mobile robot 20 may move using an elevator or the like.

The system 1 includes the mobile robot 20, a host management device 10, a network 600, a communication unit 610, and a user terminal 400. The user U1 or a user U2 can make a transport request for the transported object using the user terminal 400. For example, the user terminal 400 is a tablet computer, a smartphone, or the like. The user terminal 400 only needs to be an information processing device capable of wireless or wired communication.

In the present embodiment, the mobile robot 20 and the user terminal 400 are connected to the host management device 10 via the network 600. The mobile robot 20 and the user terminal 400 are connected to the network 600 via the communication unit 610. The network 600 is a wired or wireless local area network (LAN) or wide area network (WAN). The host management device 10 is connected to the network 600 by wire or wirelessly. The communication unit 610 is, for example, a wireless LAN unit installed in each environment. The communication unit 610 may be a general-purpose communication device such as a Wi-Fi router.

Various signals transmitted from the user terminals 400 of the users U1 and U2 are once sent to the host management device 10 via the network 600, and transmitted from the host management device 10 to the target mobile robots 20. Similarly, various signals transmitted from the mobile robot 20 are once sent to the host management device 10 via the network 600, and are transmitted from the host management device 10 to the target user terminal 400. The host management device 10 is a server connected to each equipment, and collects data from each equipment. The host management device 10 is not limited to a physically single device, and may have a plurality of devices that perform distributed processing. Further, the host management device 10 may be distributedly provided in edge devices such as the mobile robot 20. For example, a part or all of the system 1 may be installed in the mobile robot 20.

The user terminal 400 and the mobile robot 20 may transmit and receive signals without passing through the host management device 10. For example, the user terminal 400 and the mobile robot 20 may directly transmit and receive signals by wireless communication. Alternatively, the user terminal 400 and the mobile robot 20 may transmit and receive signals via the communication unit 610.

The user U1 or the user U2 requests the transport of the transported object using the user terminal 400. Hereinafter, description is made assuming that the user U1 is the transport requester at the transport source and the user U2 is the planned recipient at the transport destination (destination). Needless to say, the user U2 at the transport destination can also make a transport request. Further, a user who is located at a location other than the transport source or the transport destination may make a transport request.

When the user U1 makes a transport request, the user U1 inputs, using the user terminal 400, the content of the transported object, the receiving point of the transported object (hereinafter also referred to as the transport source), the delivery destination of the transported object (hereinafter also referred to as the transport destination), the estimated arrival time at the transport source (the receiving time of the transported object), the estimated arrival time at the transport destination (the transport deadline), and the like. Hereinafter, these types of information are also referred to as transport request information. The user U1 can input the transport request information by operating the touch panel of the user terminal 400. The transport source may be a location where the user U1 is present, or a storage location for the transported object. The transport destination is a location where the user U2 or a patient who is scheduled to use the transported object is present.

The user terminal 400 transmits the transport request information input by the user U1 to the host management device 10. The host management device 10 is a management system that manages a plurality of mobile robots 20. The host management device 10 transmits an operation command for executing a transport task to the mobile robot 20. The host management device 10 determines the mobile robot 20 that executes the transport task for each transport request. Then, the host management device 10 transmits a control signal including an operation command to the mobile robot 20. The mobile robot 20 moves from the transport source so as to arrive at the transport destination in accordance with the operation command.

For example, the host management device 10 assigns a transport task to the mobile robot 20 at or near the transport source. Alternatively, the host management device 10 assigns a transport task to the mobile robot 20 heading toward the transport source or its vicinity. The mobile robot 20 to which the task is assigned goes to the transport source to pick up the transported object. The transport source is, for example, a location where the user U1 who has requested the task is present.

When the mobile robot 20 arrives at the transport source, the user U1 or another staff member loads the transported object on the mobile robot 20. The mobile robot 20 on which the transported object is loaded autonomously moves with the transport destination set as the destination. The host management device 10 transmits a signal to the user terminal 400 of the user U2 at the transport destination. Thus, the user U2 can know that the transported object is being transported and the estimated arrival time. When the mobile robot 20 arrives at the set transport destination, the user U2 can receive the transported object stored in the mobile robot 20. As described above, the mobile robot 20 executes the transport task.

In the overall configuration described above, each element of the control system can be distributed to the mobile robot 20, the user terminal 400, and the host management device 10 to construct the control system as a whole. Further, it is possible to collect substantial elements for realizing the transport of the transported object in a single device to construct the transport system. The host management device 10 controls one or more mobile robots 20.

In the present embodiment, when an error occurs in the mobile robot 20 and the mobile robot 20 is unable to travel, the host management device 10 moves another mobile robot 20 toward the mobile robot 20 that is unable to travel. Then, the other mobile robot 20 takes over the transported object being transported by the mobile robot 20 that is unable to travel and transports the object to the transport destination. That is, the transported object mounted on the mobile robot 20 that is unable to travel is transferred to the other mobile robot 20. Then, the other mobile robot 20 moves to the transported destination of the transported object that has been transferred.

Control Block Diagram

FIG. 2 shows a control block diagram showing a control system of the system 1. As shown in FIG. 2, the system 1 includes the host management device 10, the mobile robot 20, and environmental cameras 300.

The system 1 efficiently controls a plurality of mobile robots 20 while causing the mobile robots 20 to autonomously move in a predetermined facility. Therefore, a plurality of environmental cameras 300 are installed in the facility. For example, the environmental cameras 300 are each installed in a passage, a hallway, an elevator, an entrance/exit, etc. in the facility.

The environmental cameras 300 acquire images of ranges in which the mobile robot 20 moves. In the system 1, the host management device 10 collects the images acquired by the environmental cameras 300 and the information based on the images. Alternatively, the images or the like acquired by the environmental cameras 300 may be directly transmitted to the mobile robots. The environmental cameras 300 may be surveillance cameras or the like provided in a passage or an entrance/exit in the facility. The environmental cameras 300 may be used to determine the distribution of congestion status in the facility.

In the system 1 according to a first embodiment, the host management device 10 plans a route based on the transport request information. The host management device 10 instructs a destination for each mobile robot 20 based on route planning information created by the host management device 10. Then, the mobile robot 20 autonomously moves toward the destination designated by the host management device 10. The mobile robot 20 autonomously moves toward the destination using sensors, floor maps, position information, and the like provided in the mobile robot 20 itself.

For example, the mobile robot 20 travels so as not to come into contact with surrounding equipment, objects, walls, and people (hereinafter collectively referred to as peripheral objects). Specifically, the mobile robot 20 detects the distance from the peripheral object and travels while keeping a distance from the peripheral object by a certain distance (defined as a distance threshold value) or more. When the distance from the peripheral object becomes equal to or less than the distance threshold value, the mobile robot 20 decelerates or stops. With this configuration, the mobile robot 20 can travel without coming into contact with peripheral objects. Since contact can be avoided, safe and efficient transport is possible.

The host management device 10 includes an arithmetic processing unit 11, a storage unit 12, a buffer memory 13, and a communication unit 14. The arithmetic processing unit 11 performs arithmetic for controlling and managing the mobile robot 20. The arithmetic processing unit 11 can be implemented as a device capable of executing a program such as a central processing unit (CPU) of a computer, for example. Various functions can also be realized by a program. Only a robot control unit 111, a route planning unit 115, a transported object information acquisition unit 116, and an error information acquisition unit 118 that are characteristics of the arithmetic processing unit 11 are shown in FIG. 2, but other processing blocks can also be provided.

The robot control unit 111 performs arithmetic for remotely controlling the mobile robot 20 and generates a control signal. The robot control unit 111 generates a control signal based on route planning information 125 and the like, which will be described later. Further, the robot control unit 111 generates a control signal based on various types of information obtained from the environmental cameras 300 and the mobile robots 20. The control signal may include update information such as a floor map 121, robot information 123, and a robot control parameter 122, which will be described later. That is, when various types of information are updated, the robot control unit 111 generates a control signal according to the updated information.

The error information acquisition unit 118 acquires error information related to an error that has occurred in the mobile robot 20. The error information indicates that the mobile robot 20 has become unable to travel. Further, the error information may include, for example, information such as the identification (ID) of the mobile robot 20 in which the error has occurred, the content of the error, the error occurrence location, or the error occurrence time. In addition, the error information may include the severity of the error.

The transported object information acquisition unit 116 acquires information related to the transported object. The transported object information acquisition unit 116 only needs to include information related to the content (type) of the transported object being transported by the mobile robot 20. The transported object information acquisition unit 116 only needs to include information related to the transported object being transported by the mobile robot 20.

The route planning unit 115 plans the route for each mobile robot 20. When the transport task is input, the route planning unit 115 plans the route for transporting the transported object to the transport destination (destination) based on the transport request information. Specifically, the route planning unit 115 refers to the route planning information 125, the robot information 123, and the like already stored in the storage unit 12 to determine the mobile robot 20 that executes a new transport task. The starting point is the current position of the mobile robot 20, the transport destination of the immediately preceding transport task, the receiving point of the transported object, or the like. The destination is the transport destination of the transported object, a standby location, a charging location, or the like.

Here, the route planning unit 115 sets passing points from the starting point to the destination of the mobile robot 20. The route planning unit 115 sets the passing order of the passing points for each mobile robot 20. The passing points are set, for example, at branch points, intersections, lobbies in front of elevators, and their surroundings. In a narrow passage, it may be difficult for the mobile robots 20 to pass each other. In such a case, the passing point may be set at a location before the narrow passage. Candidates for the passing points may be registered in the floor map 121 in advance.

The route planning unit 115 determines the mobile robot 20 that performs each transport task from among the plurality of mobile robots 20 such that the task can be efficiently executed as the whole system. The route planning unit 115 preferentially assigns the transport task to the mobile robot 20 at standby or the mobile robot 20 located near the transport source.

The route planning unit 115 sets the passing points including a starting point and a destination for the mobile robot 20 to which the transport task is assigned. For example, when there are two or more movement routes from the transport source to the transport destination, the passing points are set such that the movement can be performed in a shorter time. Thus, the host management device 10 updates the information indicating the congestion status of the passages based on the images of the camera or the like. Specifically, locations where other mobile robots 20 are passing and locations where there are many people have a high degree of congestion. Therefore, the route planning unit 115 sets the passing points so as to avoid locations with a high degree of congestion.

The mobile robot 20 may be able to move to the destination by either a counterclockwise movement route or a clockwise movement route. In such a case, the route planning unit 115 sets the passing points so as to pass through the less congested movement route. The route planning unit 115 sets one or more passing points to the destination, whereby the mobile robot 20 can move along a movement route that is not congested. For example, when a passage is divided at a branch point or an intersection, the route planning unit 115 sets a passing point at the branch point, the intersection, the corner, and the surroundings as appropriate. Thereby, the transport efficiency can be improved.

The route planning unit 115 may set the passing points in consideration of the congestion status of the elevator, the moving distance, and the like. Further, the host management device 10 may estimate the number of mobile robots 20 and the number of people at the estimated time when the mobile robot 20 passes through a certain location. Then, the route planning unit 115 may set the passing points in accordance with the estimated congestion status. Further, the route planning unit 115 may dynamically change the passing points in accordance with a change in the congestion status. The route planning unit 115 sets the passing points in order for the mobile robot 20 to which the transport task is assigned. The passing points may include the transport source and the transport destination. As will be described later, the mobile robot 20 autonomously moves so as to sequentially pass through the passing points set by the route planning unit 115.

The storage unit 12 is a storage unit that stores information necessary for managing and controlling the robot. In the example of FIG. 2, the floor map 121, the robot information 123, the robot control parameter 122, the route planning information 125, and transported object information 126 are shown, but the information stored in the storage unit 12 may include other information. The arithmetic processing unit 11 performs arithmetic using the information stored in the storage unit 12 when performing various processing. Further, various types of information stored in the storage unit 12 can be updated to the latest information.

The floor map 121 is map information of a facility in which the mobile robot 20 moves. The floor map 121 may be created in advance, may be generated from information obtained from the mobile robot 20, or may be information obtained by adding map correction information that is generated from information obtained from the mobile robot 20, to a basic map created in advance.

The robot information 123 indicates the ID, model number, specifications, and the like of the mobile robot 20 managed by the host management device 10. The robot information 123 may include position information indicating the current position of the mobile robot 20. The robot information 123 may include information on whether the mobile robot 20 is executing a task or at standby. Further, the robot information 123 may include information indicating whether the mobile robot 20 is operating, out of order, or the like. Furthermore, the robot information 123 may include information on the transported object that can be transported and the transported object that cannot be transported.

The robot control parameter 122 indicates control parameters such as a threshold distance from a peripheral object for the mobile robot 20 managed by the host management device 10. The threshold distance is a margin distance for avoiding contact with the peripheral objects including a person. Further, the robot control parameter 122 may include information on the operating intensity such as the speed upper limit value of the moving speed of the mobile robot 20.

The robot control parameter 122 may be updated depending on the situation. The robot control parameter 122 may include information indicating the availability and usage status of the storage space of a storage 291. The robot control parameter 122 may include information on a transported object that can be transported and a transported object that cannot be transported. The robot control parameter 122 is associated with the above-described various types of information for each mobile robot 20.

The route planning information 125 includes the route planning information planned by the route planning unit 115. The route planning information 125 includes, for example, information indicating a transport task. The route planning information 125 may include the ID of the mobile robot 20 to which the task is assigned, the starting point, the content of the transported object, the transport destination, the transport source, the estimated arrival time at the transport destination, the estimated arrival time at the transport source, the arrival deadline, and the like. In the route planning information 125, the various types of information described above may be associated with each transport task. The route planning information 125 may include at least a part of the transport request information input from the user U1.

Further, the route planning information 125 may include information on the passing points for each mobile robot 20 and each transport task. For example, the route planning information 125 includes information indicating the passing order of the passing points for each mobile robot 20. The route planning information 125 may include the coordinates of each passing point on the floor map 121 and information on whether the mobile robot 20 has passed the passing point.

Error information 128 is the error information acquired by the error information acquisition unit 118. For example, the error information includes the ID of the mobile robot 20 that has become unable to travel due to an error. Further, the error information may include the content of the error, the time of occurrence, the location of occurrence, and the like. In addition, the error information may include the severity of the error.

The transported object information 126 is information on the transported object for which the transport request has been made. For example, the transported object information 126 includes information such as the content (type) of the transported object, the transport source, and the transport destination. The transported object information 126 may include the ID of the mobile robot 20 in charge of the transport. Further, the transported object information 126 may include information indicating the status such as transport under way, pre-transport (before loading), and post-transport. The transported object information 126 is associated with these types of information for each transported object. The transported object information 126 will be described later.

The route planning unit 115 refers to various types of information stored in the storage unit 12 to formulate a route plan. For example, the route planning unit 115 determines the mobile robot 20 that executes the task, based on the floor map 121, the robot information 123, the robot control parameter 122, and the route planning information 125. Then, the route planning unit 115 refers to the floor map 121 and the like to set the passing points to the transport destination and the passing order thereof. Candidates for the passing points are registered in the floor map 121 in advance. The route planning unit 115 sets the passing points in accordance with the congestion status and the like. In the case of continuous processing of tasks, the route planning unit 115 may set the transport source and the transport destination as the passing points.

Two or more mobile robots 20 may be assigned to one transport task. For example, when the transported object is larger than the transportable capacity of the mobile robot 20, one transported object is divided into two and loaded on the two mobile robots 20. Alternatively, when the transported object is heavier than the transportable weight of the mobile robot 20, one transported object is divided into two and loaded on the two mobile robots 20. With this configuration, one transport task can be shared and executed by two or more mobile robots 20. It goes without saying that, when the mobile robots 20 of different sizes are controlled, route planning may be performed such that the mobile robot 20 capable of transporting the transported object receives the transported object.

Further, one mobile robot 20 may perform two or more transport tasks in parallel. For example, one mobile robot 20 may simultaneously load two or more transported objects and sequentially transport the objects to different transport destinations. Alternatively, while one mobile robot 20 is transporting one transported object, another transported object may be loaded on the mobile robot 20. Furthermore, the transport destinations of the transported objects loaded at different locations may be the same or different. With this configuration, the task can be executed efficiently.

In such a case, storage information indicating the usage status or the availability of the storage space of the mobile robot 20 may be updated. That is, the host management device 10 may manage the storage information indicating the availability and control the mobile robot 20. For example, the storage information is updated when the transported object is loaded or received. When the transport task is input, the host management device 10 refers to the storage information and directs the mobile robot 20 having room for loading the transported object to receive the transported object. With this configuration, one mobile robot 20 can execute a plurality of transport tasks at the same time, and two or more mobile robots 20 can share and execute the transport tasks. For example, a sensor may be installed in the storage space of the mobile robot 20 to detect the availability. Further, the capacity and weight of each transported object may be registered in advance.

The buffer memory 13 is a memory that stores intermediate information generated in the processing of the arithmetic processing unit 11. The communication unit 14 is a communication interface for communicating with a plurality of environmental cameras 300 and at least one mobile robot 20 provided in the facility where the system 1 is used. The communication unit 14 can perform both wired communication and wireless communication. For example, the communication unit 14 transmits a control signal necessary for controlling the mobile robot 20 to each mobile robot 20. The communication unit 14 receives the information collected by the mobile robot 20 and the environmental cameras 300.

The mobile robot 20 includes an arithmetic processing unit 21, a storage unit 22, a communication unit 23, a proximity sensor (for example, a distance sensor group 24), a camera 25, a drive unit 26, a display unit 27, and an operation reception unit 28. Although FIG. 2 shows only typical processing blocks provided in the mobile robot 20, the mobile robot 20 also includes many other processing blocks that are not shown.

The communication unit 23 is a communication interface for communicating with the communication unit 14 of the host management device 10. The communication unit 23 communicates with the communication unit 14 using, for example, a wireless signal. The distance sensor group 24 is, for example, a proximity sensor, and outputs proximity object distance information indicating a distance from an object or a person that is present around the mobile robot 20. The camera 25, for example, captures an image for grasping the surrounding situation of the mobile robot 20. The camera 25 can also capture an image of a position marker provided on the ceiling or the like of the facility, for example. The mobile robot 20 may be made to grasp the position of the mobile robot 20 itself using this position marker.

The drive unit 26 drives drive wheels provided on the mobile robot 20. The drive unit 26 may include an encoder or the like that detects the number of rotations of the drive wheels and the drive motor thereof. The position of the mobile robot 20 (current position) may be estimated based on the output of the encoder. The mobile robot 20 detects its current position and transmits the information to the host management device 10.

The display unit 27 and the operation reception unit 28 are realized by a touch panel display. The display unit 27 displays a user interface screen that serves as the operation reception unit 28. Further, the display unit 27 may display information indicating the destination of the mobile robot 20 and the state of the mobile robot 20. The operation reception unit 28 receives an operation from the user. The operation reception unit 28 includes various switches provided on the mobile robot 20 in addition to the user interface screen displayed on the display unit 27.

The arithmetic processing unit 21 performs arithmetic used for controlling the mobile robot 20. The arithmetic processing unit 21 can be implemented as a device capable of executing a program such as a CPU of a computer, for example. Various functions can also be realized by a program. The arithmetic processing unit 21 includes a movement command extraction unit 211, a drive control unit 212, and a detection unit 218. Although FIG. 2 shows only typical processing blocks included in the arithmetic processing unit 21, the arithmetic processing unit 21 includes processing blocks that are not shown. The arithmetic processing unit 21 may search for a route between passing points.

The movement command extraction unit 211 extracts a movement command from the control signal given by the host management device 10. For example, the movement command includes information on the next passing point. For example, the control signal may include information on the coordinates of the passing points and the passing order of the passing points. The movement command extraction unit 211 extracts these types of information as a movement command.

Further, the movement command may include information indicating that the movement to the next passing point has become possible. When the passage width is narrow, the mobile robots 20 may not be able to pass each other. There are also cases where the passage cannot be used temporarily. In such a case, the control signal includes a command to stop the mobile robot 20 at a passing point before the location at which the mobile robot 20 should stop. After the other mobile robot 20 has passed or after movement in the passage has become possible, the host management device 10 outputs a control signal informing the mobile robot 20 that the mobile robot 20 can move in the passage. Thus, the mobile robot 20 that has been temporarily stopped resumes movement.

The drive control unit 212 controls the drive unit 26 such that the drive unit 26 moves the mobile robot 20 based on the movement command given from the movement command extraction unit 211. For example, the drive unit 26 includes drive wheels that rotate in accordance with a control command value from the drive control unit 212. The movement command extraction unit 211 extracts the movement command such that the mobile robot 20 moves toward the passing point received from the host management device 10. The drive unit 26 rotationally drives the drive wheels. The mobile robot 20 autonomously moves toward the next passing point. With this configuration, the mobile robot 20 sequentially passes the passing points so as to arrive at the transport destination. Further, the mobile robot 20 may estimate its position and transmit a signal indicating that the mobile robot 20 has passed the passing point to the host management device 10. Thus, the host management device 10 can manage the current position and the transport status of each mobile robot 20.

The detection unit 218 is provided to detect an error that occurs in the mobile robot 20. For example, the detection unit 218 detects an abnormality of a sensor provided in the distance sensor group 24, the camera 25, or the like as an error. The detection unit 218 detects the occurrence of a motor abnormality in the drive unit 26 as an error. Alternatively, the detection unit 218 detects an insufficient battery level or a battery abnormality as an error. Further, the detection unit 218 may detect a mechanical failure as an error. The detection unit 218 may detect a communication abnormality in the communication unit 23 as an error. Further, the detection unit 218 detects a device abnormality that has occurred in various devices of the processor, the memory, the display unit 27, and the operation reception unit 28 as an error. For example, when various devices such as a sensor fail, error signals indicating that the devices have failed are output to the detection unit 218. The detection unit 218 detects an error based on the error signal output from the failed device. Alternatively, when the mobile robot 20 collides with an obstacle and becomes unable to travel, the detection unit 218 detects an error.

The storage unit 22 stores a floor map 221, a robot control parameter 222, and transported object information 226. FIG. 2 shows only a part of the information stored in the storage unit 22, and the storage unit 22 also includes information other than the floor map 221, the robot control parameter 222, and the transported object information 226 shown in FIG. 2. The floor map 221 is map information of a facility in which the mobile robot 20 moves. The floor map 221 is, for example, an item obtained by downloading the floor map 121 of the host management device 10. The floor map 221 may be created in advance. Further, the floor map 221 may not be the map information of the entire facility but may be the map information including a part of the area in which the mobile robot 20 is planned to move.

The robot control parameter 222 is a parameter for operating the mobile robot 20. The robot control parameter 222 includes, for example, a distance threshold value from a peripheral object. Further, the robot control parameter 222 also includes a speed upper limit value of the mobile robot 20.

Similar to the transported object information 126, the transported object information 226 includes information on the transported object. The transported object information 226 includes information such as the content (type) of the transported object, the transport source, and the transport destination. The transported object information 226 may include information indicating the status such as transport under way, pre-transport (before loading), and post-transport. The transported object information 226 is associated with these types of information for each transported object. The transported object information 126 will be described later. The transported object information 226 only needs to include information on the transported object transported by the mobile robot 20. Therefore, the transported object information 226 is a part of the transported object information 126. That is, the transported object information 226 does not have to include the information on the transport performed by other mobile robots 20.

The drive control unit 212 refers to the robot control parameter 222 and stops or decelerates the operation in response to the fact that the distance indicated by the distance information obtained from the distance sensor group 24 has fallen below the distance threshold value. The drive control unit 212 controls the drive unit 26 such that the mobile robot 20 travels at a speed equal to or lower than the speed upper limit value. The drive control unit 212 limits the rotation speed of the drive wheels such that the mobile robot 20 does not move at a speed equal to or higher than the speed upper limit value.

Error information 228 is information related to the error detected by the detection unit 218. The error information includes, for example, the type of error, the location of occurrence, and the time of occurrence. In addition, the error information may include the severity of the error.

The error information 228 related to the error detected by the detection unit 218 is transmitted to the host management device 10 via the communication unit 23. Further, the communication unit 23 attaches, to the error information 228, the ID of the mobile robot 20 in which the error has occurred, and transmits the error information 228 to the host management device 10. Thus, the error information acquisition unit 118 can acquire the error information.

Alternatively, the error information acquisition unit 118 may acquire the error information based on the images of the environmental cameras 300 or the like. For example, the error information acquisition unit 118 may acquire the error information based on the images of the environmental cameras 300. The error information acquisition unit 118 analyzes the images of the environmental cameras 300. Then, when the mobile robot 20 has not operated for a certain period of time or more in the images of the environmental cameras 300, the error information acquisition unit 118 acquires the error information assuming that the mobile robot 20 has failed. Then, the error information acquisition unit 118 specifies the ID of the mobile robot 20 in which the error has occurred, the location of occurrence of the error, the time of occurrence of the error, and the like.

Alternatively, the error information acquisition unit 118 may acquire the error information using another method. When a communication abnormality or a battery abnormality occurs in the mobile robot 20, the host management device 10 cannot receive the signal from the mobile robot 20. Therefore, when the signal from the mobile robot 20 cannot be received for a certain period of time or more, the error information acquisition unit 118 determines that the mobile robot is out of order and acquires the error information.

Here, when the error information is acquired, the host management device 10 directs another mobile robot 20 (hereinafter also referred to as a "transferred robot") to the mobile robot 20 (hereinafter also referred to as a "transferring robot") in which the error is occurring. For example, the error occurrence location included in the error information is set as the transfer location. The route planning unit 115 plans the route so as to move the transferred robot to the transfer location. Thus, the transferred robot moves to the transfer location, whereby the transported object of the transferring robot can be transferred to the transferred robot. Further, the route planning unit 115 plans the route so as to move the transferred robot to the transport destination of the transported object. The control of the transferred robot will be described later.

Configuration of Mobile Robot 20

Figure 3:
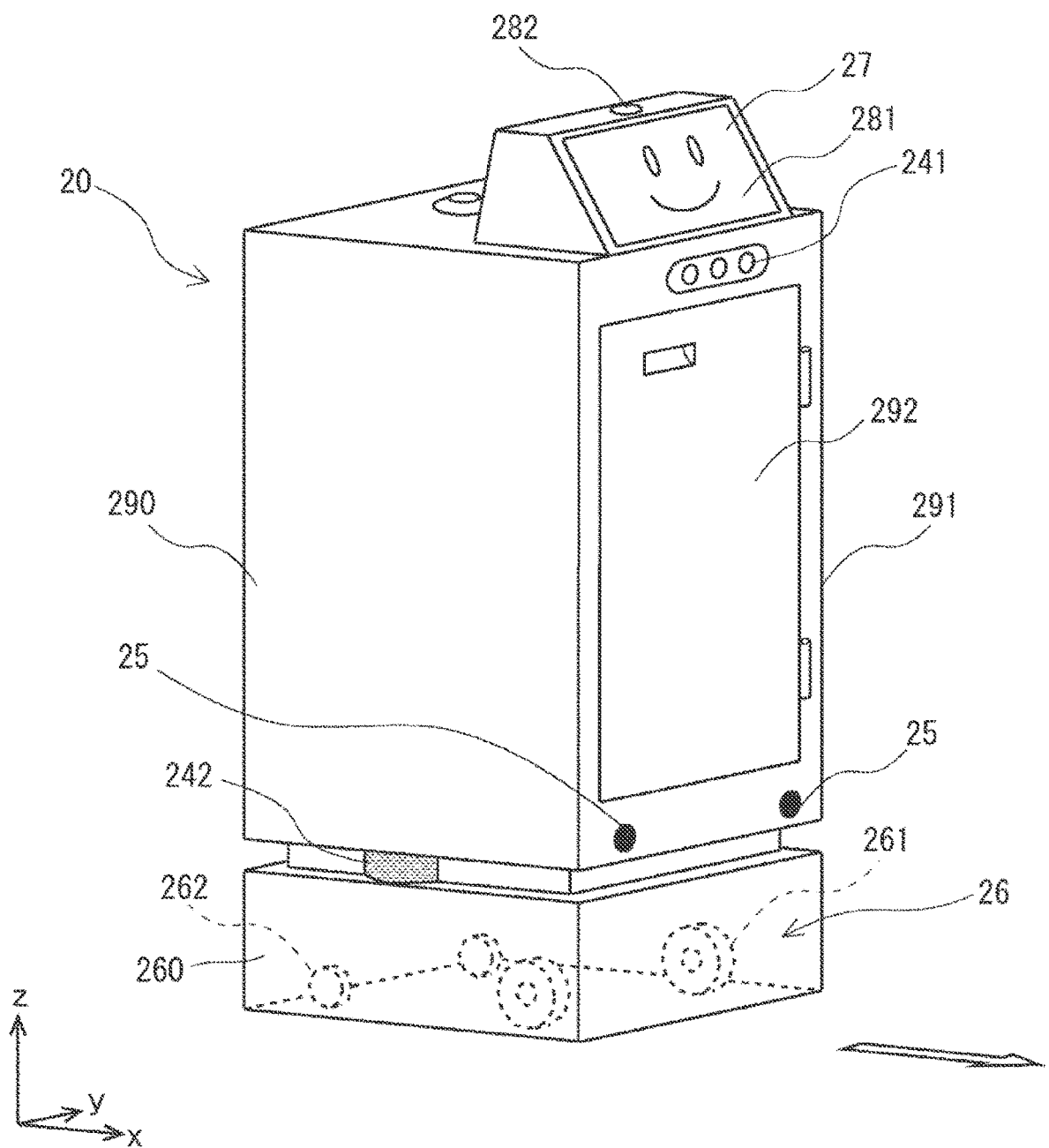
FIG. 3 is a schematic view showing an example of the mobile robot.

Here, the appearance of the mobile robot 20 will be described. FIG. 3 shows a schematic view of the mobile robot 20. The mobile robot 20 shown in FIG. 3 is one of the modes of the mobile robot 20, and may be in another form. In FIG. 3, the x direction is the forward and backward directions of the mobile robot 20, they direction is the right-left direction of the mobile robot 20, and the z direction is the height direction of the mobile robot 20.

The mobile robot 20 includes a main body portion 290 and a carriage portion 260. The main body portion 290 is installed on the carriage portion 260. The main body portion 290 and the carriage portion 260 each have a rectangular parallelepiped housing, and each component is installed inside the housing. For example, the drive unit 26 is housed inside the carriage portion 260.

The main body portion 290 is provided with the storage 291 that serves as a storage space and a door 292 that seals the storage 291. The storage 291 is provided with a plurality of shelves, and the availability is managed for each shelf. For example, by providing various sensors such as a weight sensor in each shelf, the availability can be updated. The mobile robot 20 moves autonomously to transport the transported object stored in the storage 291 to the destination instructed by the host management device 10. The main body portion 290 may include a control box or the like (not shown) in the housing. Further, the door 292 may be able to be locked with an electronic key or the like. Upon arriving at the transport destination, the user U2 unlocks the door 292 with the electronic key. Alternatively, the door 292 may be automatically unlocked when the mobile robot 20 arrives at the transport destination.

As shown in FIG. 3, front-rear distance sensors 241 and right-left distance sensors 242 are provided as the distance sensor group 24 on the exterior of the mobile robot 20. The mobile robot 20 measures the distance of the peripheral objects in the front-rear direction of the mobile robot 20 by the front-rear distance sensors 241. The mobile robot 20 measures the distance of the peripheral objects in the right-left direction of the mobile robot 20 by the right-left distance sensors 242.

For example, the front-rear distance sensor 241 is provided on the front surface and the rear surface of the housing of the main body portion 290. The right-left distance sensor 242 is provided on the left side surface and the right side surface of the housing of the main body portion 290. The front-rear distance sensors 241 and the right-left distance sensors 242 are, for example, ultrasonic distance sensors and laser rangefinders. The front-rear distance sensors 241 and the right-left distance sensors 242 detect the distance from the peripheral objects. When the distance from the peripheral object detected by the front-rear distance sensor 241 or the right-left distance sensor 242 is equal to or less than the distance threshold value, the mobile robot 20 decelerates or stops.

The drive unit 26 is provided with drive wheels 261 and casters 262. The drive wheels 261 are wheels for moving the mobile robot 20 frontward, rearward, rightward, and leftward. The casters 262 are driven wheels that roll following the drive wheels 261 without being given a driving force. The drive unit 26 includes a drive motor (not shown) and drives the drive wheels 261.

For example, the drive unit 26 supports, in the housing, two drive wheels 261 and two casters 262, each of which are in contact with the traveling surface. The two drive wheels 261 are arranged such that their rotation axes coincide with each other. Each drive wheel 261 is independently rotationally driven by a motor (not shown). The drive wheels 261 rotate in accordance with a control command value from the drive control unit 212 in FIG. 2. The casters 262 are driven wheels that are provided such that a pivot axis extending in the vertical direction from the drive unit 26 pivotally supports the wheels at a position away from the rotation axis of the wheels, and thus follow the movement direction of the drive unit 26.

For example, when the two drive wheels 261 are rotated in the same direction at the same rotation speed, the mobile robot 20 travels straight, and when the two drive wheels 261 are rotated at the same rotation speed in the opposite directions, the mobile robot 20 pivots around the vertical axis extending through approximately the center of the two drive wheels 261. Further, by rotating the two drive wheels 261 in the same direction and at different rotation speeds, the mobile robot 20 can proceed while turning right and left. For example, by making the rotation speed of the left drive wheel 261 higher than the rotation speed of the right drive wheel 261, the mobile robot 20 can make a right turn. In contrast, by making the rotation speed of the right drive wheel 261 higher than the rotation speed of the left drive wheel 261, the mobile robot 20 can make a left turn. That is, the mobile robot 20 can travel straight, pivot, turn right and left, etc. in any direction by controlling the rotation direction and the rotation speed of each of the two drive wheels 261.

Further, in the mobile robot 20, the display unit 27 and an operation interface 281 are provided on the upper surface of the main body portion 290. The operation interface 281 is displayed on the display unit 27. When the user operates a touch screen of the operation interface 281 displayed on the display unit 27, the operation reception unit 28 can receive an instruction input from the user. An emergency stop button 282 is provided on the upper surface of the display unit 27. The emergency stop button 282 and the operation interface 281 function as the operation reception unit 28.

The display unit 27 is, for example, a liquid crystal panel that displays a character's face as an illustration or presents information on the mobile robot 20 in text or with an icon. By displaying a character's face on the display unit 27, it is possible to give surrounding observers the impression that the display unit 27 is a pseudo face portion. It is also possible to use the display unit 27 or the like installed in the mobile robot 20 as the user terminal 400.

The cameras 25 are installed on the front surface of the main body portion 290. Here, the two cameras 25 function as stereo cameras. That is, the two cameras 25 having the same angle of view are provided so as to be horizontally separated from each other. An image captured by each camera 25 is output as image data. It is possible to calculate the distance from the subject and the size of the subject based on the image data of the two cameras 25. The arithmetic processing unit 21 can detect a person, an obstacle, or the like at positions forward in the movement direction by analyzing the images of the cameras 25. When there are people or obstacles at positions forward in the traveling direction, the mobile robot 20 moves along the route while avoiding the people or the obstacles. The image data of the cameras 25 is transmitted to the host management device 10.

Figure 4:
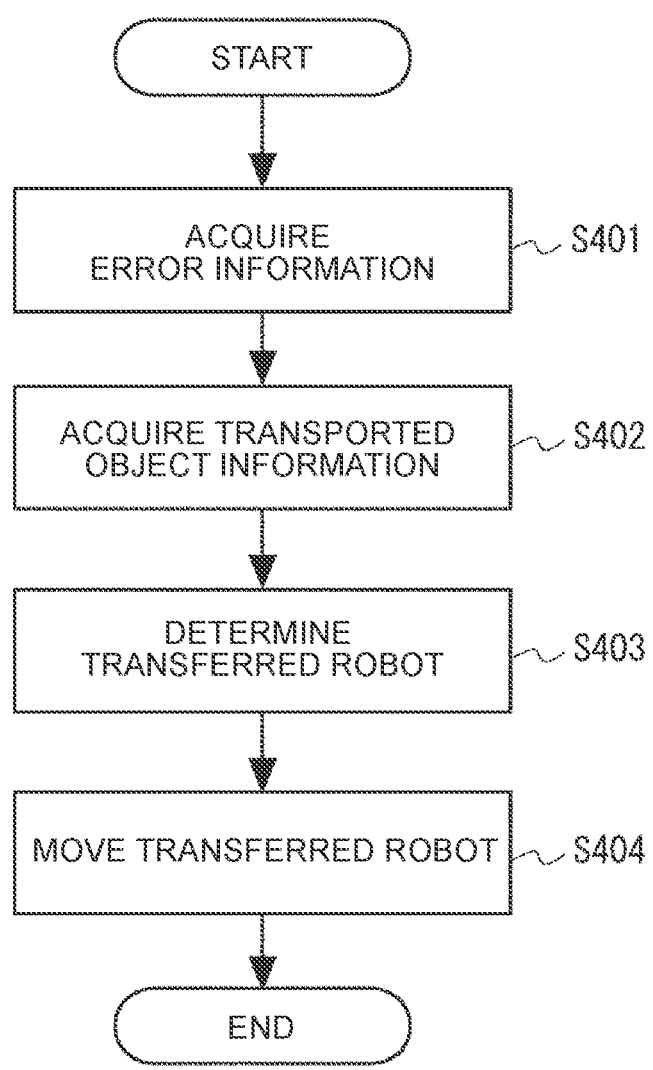
FIG. 4 is a flowchart showing a control method according to the present embodiment.

The mobile robot 20 recognizes the peripheral objects and identifies the position of the mobile robot 20 itself by analyzing the image data output by the cameras 25 and the detection signals output by the front-rear distance sensors 241 and the right-left distance sensors 242. The cameras 25 capture images of the front of the mobile robot 20 in the traveling direction. As shown in FIG. 4, the mobile robot 20 considers the side on which the cameras 25 are installed as the front of the mobile robot 20. That is, during normal movement, the traveling direction is the forward direction of the mobile robot 20 as shown by the arrow.

Figure 5:
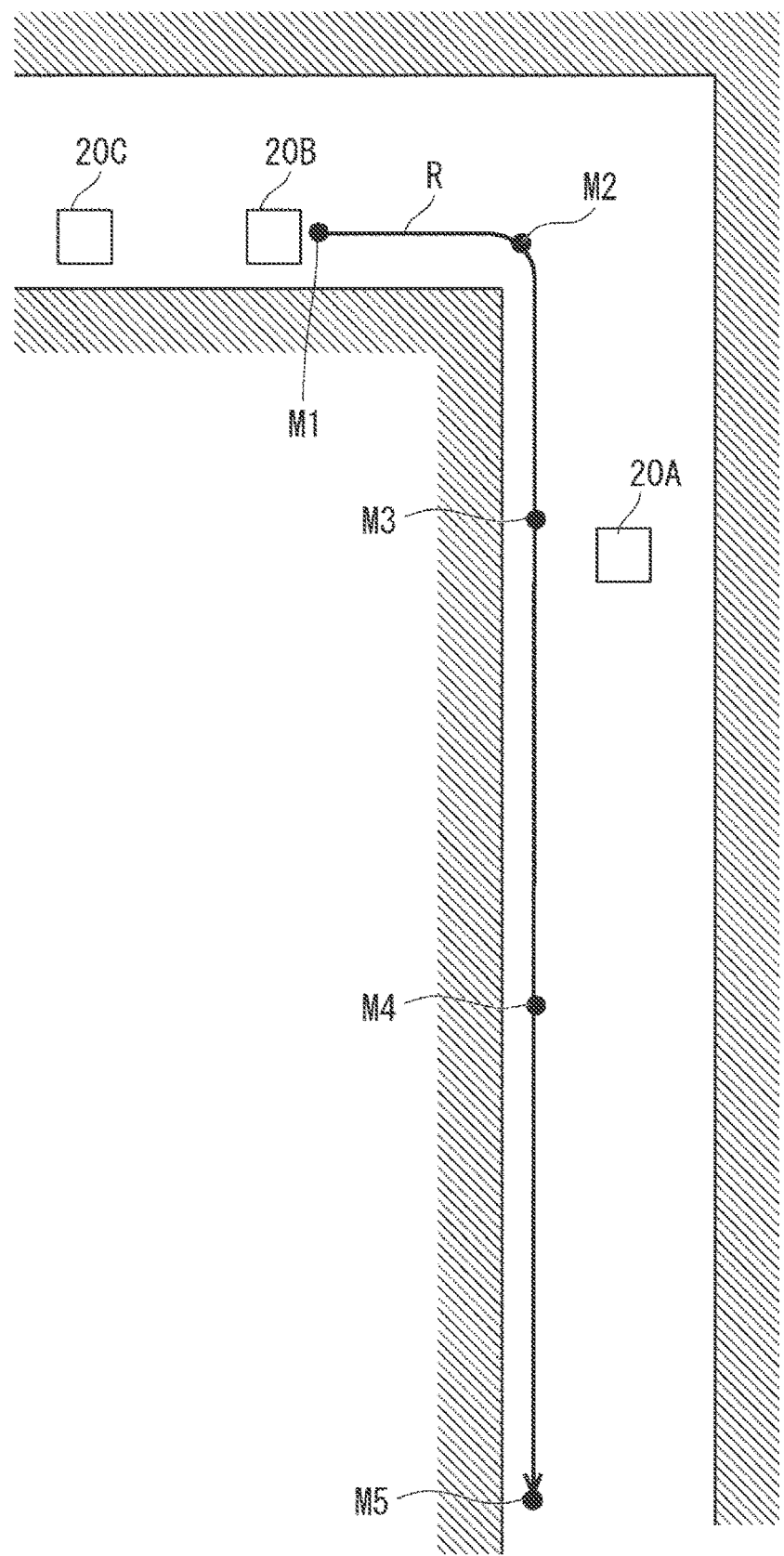
FIG. 5 is a schematic diagram for explaining an operation of the robot.

Next, the operation when an error occurs will be described. FIG. 4 is a flowchart showing a control method in the present system. FIG. 5 is a schematic diagram for explaining the control method, and shows a part of the facility where the mobile robot 20 moves. In FIG. 5, the mobile robot 20 in which the error has occurred is a transferring robot 20A, and the mobile robot heading to the location where the error has occurred is a transferred robot 20B. Further, in FIG. 5, the transferring robot 20A and the mobile robot 20 that is not the transferred robot 20B are shown as a mobile robot 20C.

The error information acquisition unit 118 acquires error information indicating that an error has occurred in the transferring robot 20A (S401). For example, the detection unit 218 of the transferring robot 20A detects abnormalities in various devices. Then, the error information 228 related to the error is written in the storage unit 22. The error information 228 includes the type of error, the occurrence location, the occurrence time, and the like.

The communication unit 23 transmits the error information 228 to the host management device 10. Here, the communication unit 23 transmits the error information together with the ID of the transferring robot 20A. Thus, the error information acquisition unit 118 acquires the error information indicating that an error has occurred in the transferring robot 20A. Alternatively, the error information acquisition unit 118 may acquire the error information based on the images of the environmental cameras 300 and the communication state as described above.

Next, the transported object information acquisition unit 116 acquires the transported object information related to the transported object transported by the transferring robot 20A (S402). The transported object information acquisition unit 116 may acquire the transported object information related to the transported object being transported by the transferring robot 20A from the transported object information 126 stored in the storage unit 12. The transported object information acquisition unit 116 acquires the transported object information with reference to the ID of the transferring robot 20A. Alternatively, the transferring robot 20A may transmit the transported object information to the host management device 10 together with the error information. Then, the transported object information acquisition unit 116 may acquire the transported object information related to the transported object of the transferring robot 20A by receiving the transported object information from the transferring robot 20A.

The route planning unit 115 determines the transferred robot 20B capable of transporting the transported object of the transferring robot 20A based on the transported object information and the error information (S403). Here, the mobile robot 20 having a free capacity for mounting the transported object in the storage 291 is a candidate for the transferred robot 20B. Therefore, the mobile robot 20 that cannot transport the transported object of the transferring robot 20A and the mobile robot 20 that does not have sufficient free space may be excluded from the candidates of the transferred robot 20B. Further, the mobile robot 20 in which the error is occurring is excluded from the candidates of the transferred robot 20B.

Then, among the candidate mobile robots 20, the mobile robot close to the transfer location is set as the transferred robot 20B. Here, the transfer location of the transported object is set near the error occurrence location. The route planning unit 115 may determine the transferred robot 20B in accordance with the distance to the transfer location. Therefore, the mobile robot 20C that is farther from the transferring robot 20A than the transferred robot 20B is not set as the transferred robot.

Alternatively, the route planning unit 115 may determine the transferred robot 20B in accordance with the situation of other transport tasks. For example, the mobile robot 20 waiting for the task may be set as the transferred robot 20B. The route planning unit 115 may determine the transferred robot 20B with reference to the floor map 121, the robot information 123, the robot control parameter 122, the error information 128, or the route planning information 125.

Further, the route planning unit 115 may determine the mobile robot 20 that transports the transported object to or near the transport destination of the transported object of the transferring robot 20A as the transferred robot 20B. In other words, the route planning unit 115 may not set, as the transferred robot 20B, the mobile robot that is currently executing the task while traveling in the opposite direction to the transport destination of the transported object of the transferring robot 20A. In this case, the mobile robot 20 of which free space in the storage 291 is not sufficient may be a candidate for the transferred robot 20B. For example, when the mobile robot 20 of which transport destination is the transfer location or its vicinity arrives at the transport destination, the transported object is taken out. After the transported object is transported, the free capacity of the storage 291 increases. Therefore, the transported object to be transferred can be loaded.

As described above, the route planning unit 115 may determine the transferred robot 20B among the mobile robots 20 in accordance with the distance to the transfer location of each mobile robot 20, the route plan, the task status, and the like. Here, the route planning unit 115 determines the transferred robot 20B such that the transported objects can be transported with high efficiency as the whole system.

Next, the host management device 10 moves the transferred robot 20B to the transfer location of the transported object of a first transport robot (S404). Therefore, the route planning unit 115 first plans the route for the transferred robot 20B. Specifically, the route planning unit 115 plans the route such that the transferred robot 20B moves to the transport destination via the transfer location. The route plan planned by the route planning unit 115 is written in the route planning information 125. That is, the transferred robot 20B and the route for the transferred robot 20B are written in the route planning information 125 as one transport task. The transfer location is the location from which the transported object is transported. Then, the host management device 10 transmits a signal including a movement command in accordance with the route planning information 125 to the transferred robot 20B. Thus, the transferred robot 20B starts movement to the transfer location.

In FIG. 5, the route planning unit 115 plans a route R of the transferred robot 20B such that the transferred robot 20B passes in the order of passing points M1, M2, M3, M4, and M5. The route planning unit 115 plans the route R of the transferred robot 20B with reference to the floor map 121, the robot information 123, the robot control parameter 122, the error information 128, or the route planning information 125.

The passing point M1 is the position of the transferred robot 20B when an error occurs. The passing point M3 is the transfer location. Specifically, the passing point M3 is near the error occurrence location of the transferring robot 20A. The passing point M3 serves as the transport source of the transported object to be transferred. The passing point M2 is a corner from the passing point M1 to the passing point M3. Then, when the transferred robot 20B reaches the passing point M3, the transported object of the transferring robot 20A is transferred to the transferred robot 20B.

For example, when the user (also referred to as a facility staff member or staff member) is present near the transfer location, the user transfers the transported object. That is, the user takes out the transported object from the transferring robot 20A and mounts the transported object on the transferred robot 20B. Alternatively, when the transferring robot 20A or the transferred robot 20B has a transfer function, the transferring operation may be performed automatically. For example, some mobile robots 20 may have a transfer robot arm or a transferring mechanism.

The passing points M4 and M5 are the transport destinations of the transported objects, respectively. For example, the passing point M4 is the transport destination of the transported object mounted before the transfer, that is, the transported object mounted at the time of the passing point M1. The passing point M5 is the transport destination of the transported object that has been transferred, that is, the transported object mounted at the passing point M3. Needless to say, the passing point M5 may be the transport destination of the transported object mounted before the transfer, and the passing point M5 may be the transport destination of the transported object that has been transferred. Further, when there are two or more transported objects that have been transferred, the route planning unit 115 sets a passing point to each transport destination. Needless to say, the passing points M1 to M5 shown in the drawing are exemplary examples and are not particularly limited.

With this configuration, even when an error occurs in the mobile robot 20, the transported object can be transported without delay. Accordingly, the transport efficiency can be improved, and convenience can be improved.

Figure 6:
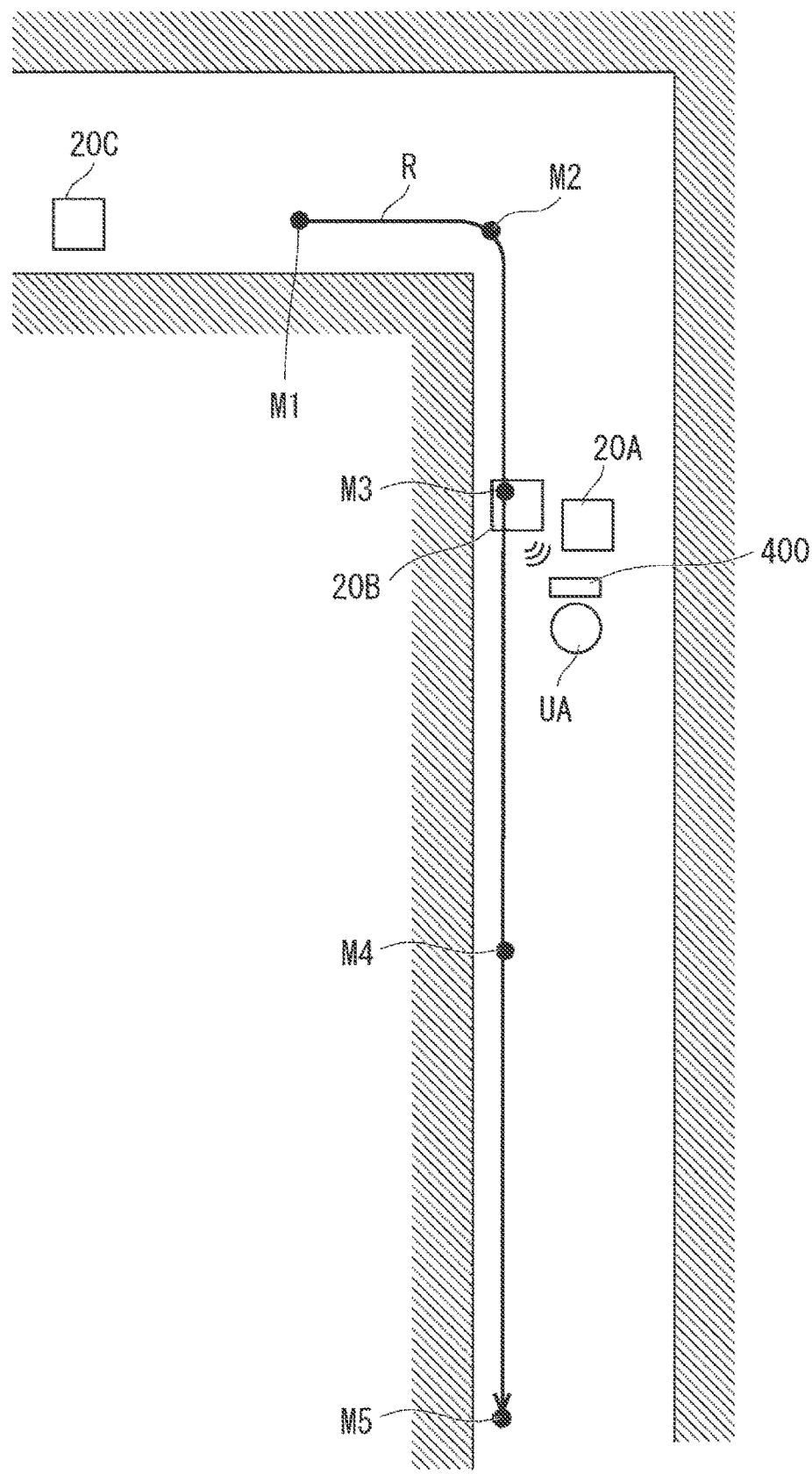
FIG. 6 is a schematic diagram for explaining the operation of the robot.

Here, the host management device 10, the mobile robot 20, the user terminal 400, and the like may output a request message for requesting the facility staff member to transfer. For example, as shown in FIG. 6, it is assumed that the transferred robot 20B arrives the passing point M3 that is the transfer location. In this case, the transferred robot 20B may transmit a signal for outputting a transfer request message to the user terminal 400 of the user UA near the passing point M3. In this case, the host management device 10 may transmit a signal for outputting a transfer request message to the user terminal 400 of the user UA near the passing point M3. The user terminal 400 displays a request message on the display. The request message may be displayed by the display unit 27 of the mobile robot 20 instead of the user terminal 400.

The request message may be a voice message, an alarm sound, or the like. That is, the request message may be output by a speaker or the like. For example, the speaker of the user terminal 400 or the mobile robot 20, or the speaker installed in the facility may output the request message. Further, the timing of outputting the request message is not limited to the timing at which the transferred robot 20B arrives at the transfer location, and may be before or after the arrival. Further, the user terminal 400 may output a request message when an error occurs. In this case, the user terminal 400 may output a request message together with the estimated arrival time of the transferred robot 20B at the transfer location.

Further, the host management device 10, the mobile robot 20, the user terminal 400, and the like may set a staff member to whom a request message for transfer is output in accordance with the transported object information. For example, the user (staff member) who can handle specimens, blood transfusion packs, drugs, medical devices, etc. are limited. In this case, the request message may be output only to the qualified staff member such as a doctor, a nurse, and a pharmacist. That is, the host management device 10 or the transferred robot 20B transmits a command for outputting a request message only to the staff member whose handling is approved. In this case, the user terminal 400 and the user who uses the user terminal 400 may be associated with each other. Alternatively, the user may be associated with a login ID of the user terminal 400 or the like. Then, the user terminal 400 of the staff member who is qualified to handle outputs the request message. Needless to say, the number of staff members to whom the request message is output is not limited to one, and may be two or more.

The host management device 10 may determine the priority of transferring the transported objects based on the transported object information. For example, when a transport deadline is set for the transported object, the route planning unit 115 increases the priority of the transported object having a short transport deadline and determines the transferred robot 20B. Alternatively, when the transport deadline is set for the transported object, the route planning unit 115 increases the priority of the transported object having a short transport deadline and plans the route for the transferred robot 20B. For example, for drugs and medical devices of which usage time is predetermined, the transport deadline is set so as to meet the usage time. Then, the host management device 10 sets the transfer priority in accordance with the transport deadline included in the transported object information.

When an error occurs in two or more mobile robots 20, a plurality of transferring robots 20A is present at different locations. When the priority of the transported object of the transferring robot 20A is low although the transferring robot 20A has an early error occurrence time, the route planning unit 115 plans the route such that the transferred object of another transferring robot 20A is transferred first. Robot control is executed such that the transported object having an early transport deadline is transferred before the transported object having no transport deadline or the transported object having a late transport deadline. With this configuration, the transported object can be transported without delay from the transport deadline.

Note that, the route planning unit 115 may determine the necessity of transfer based on the transported object information. For example, in the case of an urgent drug or sample, the transferred robot 20B is directed to the transfer location. That is, in the case of a highly urgent transported object such as a drug or a sample, the route planning unit 115 determines that the transfer is necessary and determines the transferred robot 20B. Alternatively, for a medical device having a fixed usage, etc., the route planning unit 115 determines that transfer is necessary. For other transported objects with low urgency, the route planning unit 115 determines that transfer is not necessary and does not determine the transferred robot 20B. That is, the other mobile robot 20 does not move to the transfer location.

The route planning unit 115 may determine the necessity of transfer based on the error information. For example, in the case of a minor error, the mobile robot 20 can recover by itself. When the mobile robot 20 resets or restarts the device, the mobile robot 20 is recovered. Thus, the error state of the mobile robot 20 is eliminated, and the transported object can be transported again. In such a case, determination of the transferred robot 20B is not necessary.

In the case of the battery run-out, hardware failure, etc., where the severity of the error is high, the route planning unit 115 determines that transfer is necessary. In this case, the host management device 10 determines the transferred robot 20B and directs the transferred robot 20B to the transfer location. Further, when the transport robot can recover by itself due to a traffic jam of the transport robot, a momentary interruption of the device, etc., where the severity of the error is small, the host management device 10 does not have to determine the transferred robot 20B. As described above, the route planning unit 115 may determine the necessity of transfer in accordance with the severity of the error.

When the route planning unit 115 determines that transfer is not necessary in accordance with the transported object information and the error information, a transport request message for making a transport request to the staff member (user) of the facility may be output. For example, when an error occurs in the mobile robot 20 near the transport destination, the transport request message is output to the staff member who is present in the vicinity. The transport request message may be displayed on the display unit 27 of the mobile robot 20 or may be output to the user terminal 400. Further, the request message may be a voice message, an alarm sound, or the like. That is, the transport request message may be output by a speaker or the like. The route planning unit 115 determines that the transported object with low urgency does not require transfer. Alternatively, when the time required for transfer is longer than a certain period of time, it is more efficient for the staff member to carry the transported object. Therefore, the route planning unit 115 determines that transfer is not necessary. With this configuration, the staff member can take out the transported object at an appropriate timing in accordance with the situation of the staff member.

When the route planning unit 115 determines that transfer is necessary in accordance with the transported object information and the error information, the transport request message for making a transport request to the staff member (user) of the facility may be output. For example, there may be a case where the transported object is a highly urgent transported object, and the transferred robot 20B may not arrive in time for the transportation deadline. In such a case, the user terminal 400 outputs the transport request message to the staff member of the facility near the error occurrence location. With this configuration, the staff member can take out the transported object promptly.

The host management device 10 may control the mobile robot 20 such that two or more transferred robots 20B are directed to one transferring robot 20A. That is, when there are many transferring robots 20A, the host management device 10 determines two or more mobile robots 20 as the transferred robots 20B. Alternatively, when the transferring robot 20A is transporting a plurality of the transported objects and the transport destinations thereof are different, the host management device 10 determines two or more mobile robots 20 as the transferred robots 20B in accordance with the transported object information including the transport destinations. With this configuration, the transport efficiency can be further improved.

Needles to say, one transferred robot 20B may transfer the transported objects of two or more transferring robots 20A. That is, the route planning unit 115 may determine one mobile robot 20 as the transferred robot 20B for executing the transport task of the transported objects of two or more transferring robots 20A. For example, when the transferred robot 20B has a sufficient free capacity, the transferred robot 20B may be sequentially moved to the transfer location of two or more transferring robots 20A. With this configuration, the transport efficiency can be further improved.

Further, a part or all of the processing in the host management device 10, the mobile robot 20, or the like described above can be realized as a computer program. Such a program can be stored using various types of non-transitory computer-readable media and supplied to a computer. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). The program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiment, and can be appropriately modified without departing from the spirit. For example, in the above embodiment, a system in which a transport robot autonomously moves in a hospital has been described, but the above-described system can transport a predetermined article in a hotel, a restaurant, an office building, an event venue, or a complex facility as luggage.

What is claimed is:

1. A robot control system that controls a plurality of transport robots that is travelable autonomously in a facility, wherein the robot control system:
    acquires error information indicating that an error has occurred in a first transport robot;
    acquires transported object information related to a transported object of the first transport robot;
    determines a second transport robot able to transport the transported object of the first transport robot among the transport robots based on the transported object information and the error information; and
    moves the second transport robot to a transfer location of the transported object of the first transport robot;
    wherein the error information includes information that the first transport robot has become unable to travel due to an abnormality of a sensor, motor abnormality or mechanical failure.

2. The robot control system according to claim 1, wherein the robot control system determines a priority of a transfer of the transported object based on the transported object information.

3. The robot control system according to claim 1, wherein the robot control system outputs a transfer request message for requesting a transfer of the transported object to a staff member of the facility.

4. The robot control system according to claim 3, wherein the robot control system sets the staff member to whom the transfer request message is output in accordance with the transported object information.

5. The robot control system according to claim 1, wherein the robot control system determines a necessity of the transfer based on the transported object information.

6. The robot control system according to claim 1, wherein the robot control system determines a necessity of the transfer based on the error information.

7. The robot control system according to claim 1, wherein when the robot control system determines that the transfer is not necessary in accordance with the transported object information, the robot control system outputs a transport request message for making a transport request to a staff member of the facility.

8. A robot control method that controls a plurality of transport robots that is travelable autonomously in a facility, the robot control method comprising:
    acquiring error information indicating that an error has occurred in a first transport robot;
    acquiring transported object information related to a transported object of the first transport robot;
    determining a second transport robot able to transport the transported object of the first transport robot among the transport robots based on the transported object information and the error information; and
    moving the second transport robot to a transfer location of the transported object of the first transport robot;
    wherein the error information includes information that the first transport robot has become unable to travel due to an abnormality of a sensor, motor abnormality or mechanical failure.

9. The robot control method according to claim 8, further comprising determining a priority of a transfer of the transported object based on the transported object information.

10. The robot control method according to claim 8, further comprising outputting a transfer request message for requesting a transfer of the transported object to a staff member of the facility.

11. The robot control method according to claim 10, further comprising setting the staff member to whom the transfer request message is output in accordance with the transported object information.

12. The robot control method according to claim 8, further comprising determining a necessity of the transfer based on the transported object information.

13. The robot control method according to claim 8, further comprising determining a necessity of the transfer based on the error information.

14. The robot control method according to claim 8, further comprising outputting a transport request message for making a transport request to a staff member of the facility when the transfer is determined to be not necessary in accordance with the transported object information.

15. A non-transitory computer-readable medium storing a program that causes a computer to execute a robot control method that controls a plurality of transport robots that is travelable in a facility, wherein the robot control method includes:
  acquiring error information indicating that an error has occurred in a first transport robot;
  acquiring transported object information related to a transported object of the first transport robot;
  determining a second transport robot able to transport the transported object of the first transport robot among the transport robots based on the transported object information and the error information; and
  moving the second transport robot to a transfer location of the transported object of the first transport robot;
  wherein the error information includes information that the first transport robot has become unable to travel due to an abnormality of a sensor, motor abnormality or mechanical failure.

16. The computer-readable medium according to claim 15, wherein a priority of a transfer of the transported object is determined based on the transported object information.

17. The computer-readable medium according to claim 15, wherein a transfer request message for requesting a transfer of the transported object is output to a staff member of the facility.

18. The computer-readable medium according to claim 17, wherein the staff member to whom the transfer request message is output is set in accordance with the transported object information.

19. The computer-readable medium according to claim 15, wherein a necessity of the transfer is determined based on the transported object information.

20. The computer-readable medium according to claim 15, wherein a necessity of the transfer is determined based on the error information.

21. The computer-readable medium according to claim 15, wherein when the transfer is determined to be not necessary in accordance with the transported object information, a transport request message for making a transport request is output to a staff member of the facility.

* * * * *